(12) United States Patent
Sumi (10) Patent No.: US 11,482,913 B2
(45) Date of Patent: Oct. 25, 2022

(54) COIL MANUFACTURING METHOD, COIL MANUFACTURING DEVICE, COIL, AND MOTOR

(71) Applicant: NIDEC CORPORATION, Kyoto (JP)

(72) Inventor: Shigeharu Sumi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 359 days.

(21) Appl. No.: 16/630,858

(22) PCT Filed: Jun. 12, 2018

(86) PCT No.: PCT/JP2018/022315
§ 371 (c)(1),
(2) Date: Jan. 14, 2020

(87) PCT Pub. No.: WO2019/064712
PCT Pub. Date: Apr. 4, 2019

(65) Prior Publication Data
US 2020/0144900 A1 May 7, 2020

(30) Foreign Application Priority Data

Sep. 28, 2017 (JP) .............................. JP2017-188041

(51) Int. Cl.
*H02K 15/04* (2006.01)
*H02K 3/18* (2006.01)
(Continued)

(52) U.S. Cl.
CPC ............. *H02K 15/04* (2013.01); *B21F 15/02* (2013.01); *H02K 1/146* (2013.01); *H02K 3/18* (2013.01);
(Continued)

(58) Field of Classification Search
CPC .. H02K 15/04; H02K 15/0435; H02K 15/045; B21F 5/00; B21F 5/005; B21F 3/02; B21J 9/027; B21J 13/025; B21J 5/08
(Continued)

(56) References Cited

U.S. PATENT DOCUMENTS

| | | | |
|---|---|---|---|
| 7,928,626 B2* | 4/2011 | Kamibayashi | H02K 3/12 310/201 |
| 8,427,024 B2* | 4/2013 | Watanabe | H02K 3/12 310/179 |

(Continued)

FOREIGN PATENT DOCUMENTS

| | | | | |
|---|---|---|---|---|
| CN | 105515290 A | | 4/2016 | |
| EP | 2688183 A2 * | | 1/2014 | ............... H02K 3/18 |

(Continued)

OTHER PUBLICATIONS

English machine translation, JP 2007-082268. (Year: 2007).*

*Primary Examiner* — Burton S Mullins
(74) *Attorney, Agent, or Firm* — Hauptman Ham, LLP (57) ABSTRACT

A manufacturing method for a coil includes: a step of winding a wire (conductive wire) in multiple layers and multiple rows and forming a coil having a trapezoidal cross-sectional shape; a step of arranging the coil in a molding space surrounded by a plurality of split dies; and a step of moving the slit die in a direction of narrowing the molding space to mold the cross-sectional shape of the coil. In the step of molding the cross-sectional shape, at least one of the plurality of split dies is moved to mold the cross-sectional shape into a fan shape by surfaces formed in the split dies.

18 Claims, 9 Drawing Sheets

(51) Int. Cl.
  *H02K 15/095*  (2006.01)
  *B21F 15/02*  (2006.01)
  *H02K 1/14*  (2006.01)
  *H02K 15/02*  (2006.01)

(52) U.S. Cl.
  CPC ......... *H02K 15/022* (2013.01); *H02K 15/095* (2013.01)

(58) Field of Classification Search
  USPC .................................. 72/381, 383, 394, 399
  See application file for complete search history.

(56) References Cited

U.S. PATENT DOCUMENTS

| | | | |
|---|---|---|---|
| 9,071,114 B2* | 6/2015 | Tanahashi | H02K 15/045 |
| 9,824,806 B2* | 11/2017 | Nonaka | H01F 41/071 |
| 10,547,219 B2* | 1/2020 | Nonaka | H02K 3/18 |
| 10,855,152 B2 | 12/2020 | Manning et al. | |
| 2009/0102309 A1 | 4/2009 | Kamibayashi et al. | |
| 2014/0208583 A1* | 7/2014 | Tanahashi | H02K 15/045 |
| | | | 29/745 |
| 2016/0013692 A1* | 1/2016 | Wawrzyniak | H02K 3/14 |
| | | | 219/76.1 |

FOREIGN PATENT DOCUMENTS

| | | |
|---|---|---|
| JP | 3652348 B2 | 5/2005 |
| JP | 2006-33985 A | 2/2006 |
| JP | 2007-82268 A | 3/2007 |
| JP | 2008-278628 A | 11/2008 |
| JP | 2014-100008 A | 5/2014 |

* cited by examiner

COIL MANUFACTURING METHOD, COIL MANUFACTURING DEVICE, COIL, AND MOTOR

CROSS-REFERENCE TO RELATED APPLICATIONS

This is the U.S. national stage of application No. PCT/JP2018/022315, filed on Jun. 12, 2018, and priority under 35 U.S.C. § 119(a) and 35 U.S.C. § 365(b) is claimed from Japanese Application No. 2017-188041, filed on Sep. 28, 2017.

FIELD OF THE INVENTION

The present disclosure relates to a coil manufacturing method, a coil manufacturing device, a coil, and a motor.

BACKGROUND

In recent years, there is a demand for reduction in size and an increase in output of a motor. It is necessary to improve the torque density of the motor in order to achieve the reduction in size and the increase in output of the motor. Further, it is advantageous to increase a space factor of a coil in a slot of a stator in order to improve the torque density of the motor. The space factor is a ratio of the total cross-sectional area of the coil arranged in the slot to the cross-sectional area of the slot of the stator of the motor.

There is known that a wire (conductive wire) having a trapezoidal cross-sectional shape is used to increase a space factor of a coil. The wire is a wire having a different trapezoidal cross-sectional shape for each area corresponding to one turn of the coil. Hereinafter, such a wire having a plurality of trapezoidal cross sections having different dimensions will be referred to as a "composite trapezoidal wire". The entire outer shape of the coil is bent along a stator surface after winding such a wire in a trapezoidal shape in multiple layers and multiple rows to obtain a substantially fan shape.

However, the technique described above does not clearly disclose how to shape the coil obtained by winding the composite trapezoidal wire in multiple layers and multiple rows into the coil having the substantially fan-shaped cross section.

SUMMARY

A coil manufacturing method according to one aspect of the present disclosure includes: a step of forming a coil having a trapezoidal cross-sectional shape by winding a wire in multiple layers and multiple rows; a step of arranging the coil in a molding space surrounded by a plurality of split dies; and a step of molding the cross-sectional shape by moving the split die in a direction of narrowing the molding space. At least one of the plurality of split dies is moved to mold the cross-sectional shape into a fan shape by a surface formed in the split die in the step of molding the cross-sectional shape.

A coil manufacturing device according to one aspect of the present disclosure includes: a winding device that includes a winding core configured to form a coil which is obtained by winding a wire in multiple layers and multiple rows and has a trapezoidal cross-sectional shape; and a molding device that molds the cross-sectional shape of the coil formed by the winding device. The molding device includes: a plurality of split dies arranged so as to form a molding space in which the coil formed by the winding device is arranged in a state of being wound around the winding core; and a movement mechanism that moves at least one of the plurality of split dies in a direction of narrowing the molding space. The cross-sectional shape of the coil is molded into a fan shape by a surface formed in the split die.

Furthermore, a coil according to one aspect of the present disclosure is a coil manufactured by the above-described coil manufacturing method and attached to a stator, and a cross-sectional shape of the coil inside a slot of the stator is a fan shape.

In addition, a motor according to one aspect of the present disclosure includes: a shaft centered on a central axis extending in a predetermined direction; a rotor fixed to the shaft; and a stator. The stator includes: an annular core back; a tooth protruding radially from the core back; and a coil wound around the tooth, and the coil is the above-described coil.

The above and other elements, features, steps, characteristics and advantages of the present disclosure will become more apparent from the following detailed description of the preferred embodiments with reference to the attached drawings.

DETAILED DESCRIPTION

Hereinafter, an embodiment of the present disclosure will be described with reference to the drawings. Note that the scope of the present disclosure is not limited to the embodiment described below, but includes any modification thereof within the scope of the technical idea of the present disclosure. In addition, there is a case where scales, numbers, and the like of structures illustrated in the following drawings may differ from those of actual structures, for the sake of easier understanding of the structures.

Figure 1:
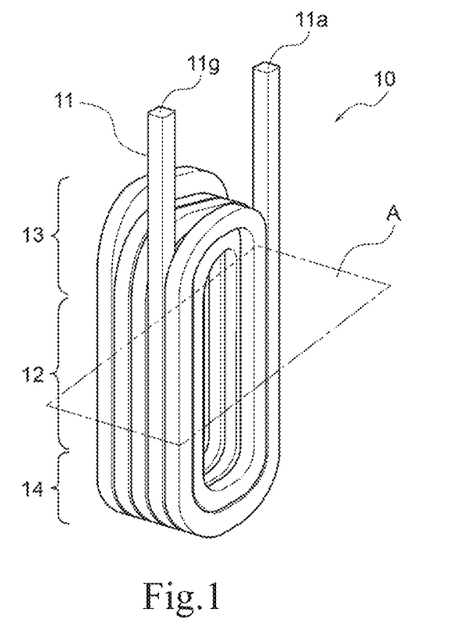
FIG. 1 is a configuration example of a coil according to the present embodiment.

FIG. 1 is a perspective view illustrating a configuration example of a coil 10 according to the present embodiment. The coil 10 is formed by winding a wire (wire-shaped conductive wire) 11. The coil 10 is a stator coil which is used for a motor that rotates about a central axis extending in a predetermined direction. Here, the motor can be used as a motor that can be mounted in mounting target objects of each field, for example, a moving body such as an automobile, an electric car, an electric assist device, an electric airplane, and a multicopter, industrial equipment such as a robot, information recording/reproducing equipment which rotates an information recording medium, a household appliance, office equipment, medical equipment, and the like. Note that a description will be given using a direction of the central axis of the motor as a vertical direction in the present specification for the sake of convenience, but an attitude during use of the motor is not limited thereto. In addition, the direction of the central axis of the motor will be simply referred to as an "axial direction", and a radial direction and a circumferential direction about the central axis will be simply referred to as the "radial direction" and the "circumferential direction".

The coil 10 in the present embodiment is formed by a method of winding the single conductive wire 11 in multiple layers and multiple rows in one direction and leading out a lead wire on the outermost circumference. In the present embodiment, a description will be given regarding a case where the coil 10 has a configuration in which the conductive wire 11 is wound in two layers and five rows (2×5=10 turns), and an end of the conductive wire 11 is led out from an outer circumference of the first row and an outer circumference of the second row. The coil 10 includes: a slot accommodating portion 12 accommodated in a slot of a stator core of the motor; a coil end portion 13 on the lead wire side; and a coil end portion 14 on the opposite side of the lead wire. The conductive wire 11 of the slot accommodating portion 12 and the coil end portion 14 is wound in completely aligned windings, and the crossing (overlap) of the conductive wires 11 is performed at the coil end portion 13.

Figure 2:
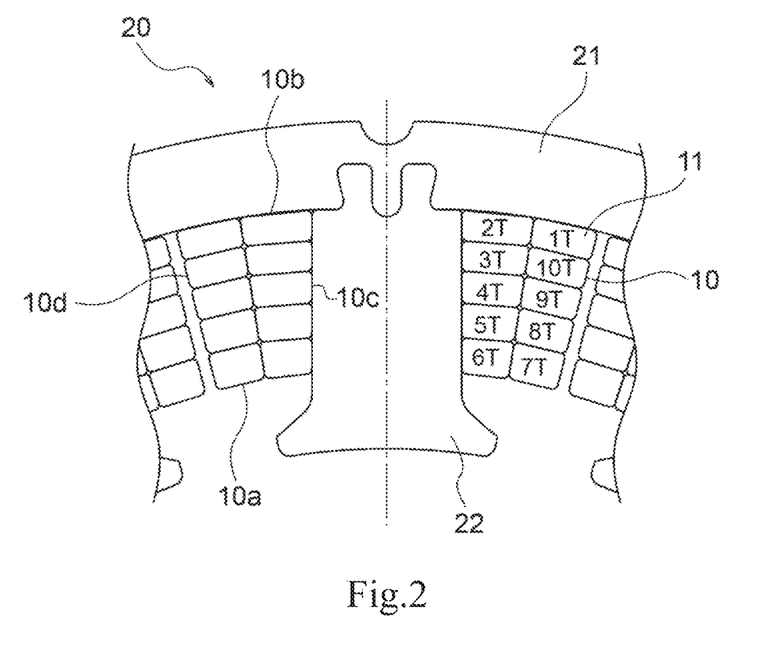
FIG. 2 is a view illustrating a cross-sectional shape of the coil.

FIG. 2 is a view illustrating a cross-sectional shape when the coil 10 is cut along a cutting plane A set in the slot accommodating portion 12. FIG. 2 illustrates a case where the coil 10 is used in an inner rotor type motor. The inner rotor type motor includes: a shaft centered on a central axis extending in a predetermined direction (vertical direction); a rotor fixed to the shaft; and a stator arranged on the radially outer side of the rotor. An inner circumferential surface of the stator is arranged so as to oppose a rotor magnet fixed to the shaft with a gap in the radial direction. The stator includes a stator core 20 and the coil 10. The stator core 20 includes an annular core back 21 and a plurality of teeth 22 protruding to the radially inner side from the core back 21. The coil 10 is wound around the tooth 22. In FIG. 2, a reference sign, such as "1T" and "2T", given to a cross section of the conductive wire 11 indicates winding order of the coil 10.

As illustrated in FIG. 2, the coil 10 has a cross-sectional shape of a fan shape (including a substantially fan shape) inside the slot of the stator. Here, the cross-sectional shape of the coil 10 inside the slot can be formed as a fan shape constituted by two concentric arcs 10a and 10b having different centers from the core back 21 of the stator and straight lines 10c and 10d respectively connecting ends of the two arcs. In this case, the straight line 10c connecting the ends, close to the tooth 22, of the two arcs is the straight line along a shape of the tooth 22. That is, the conductive wire 11 is wound along a straight portion of the tooth 22. In addition, a cross-sectional shape of the conductive wire 11 is different for each row. Specifically, the cross-sectional shape of the conductive wire 11 has a trapezoidal shape with a lower height and a longer bottom side as a row is arranged closer to the radially outer side of the motor. Note that the magnitude of an electrical resistance value of the conductive wire 11 is determined by a portion where the cross-sectional area of the conductive wire 11 is the smallest, but the electrical resistance value in the conductive wire 11 can be made constant since the cross-sectional area of the conductive wire 11 in each row is the same.

Figure 3A:
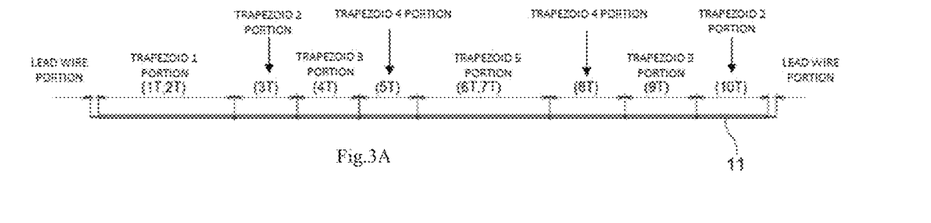
FIGS. 3A to 3F are examples of a wire forming the coil.

Such a coil 10 is a coil that realizes a high space factor, and can be obtained by molding a coil, obtained by winding a composite trapezoidal wire so that a cross-sectional shape becomes a trapezoidal shape (including a substantially trapezoidal shape), so as to have the fan-shaped cross-sectional shape. FIG. 3A is a view illustrating an example of the composite trapezoidal wire. As illustrated in FIG. 3A, the conductive wire 11 which is the composite trapezoidal wire has areas (lead wire portions) serving as the coil lead wires at both ends. A central portion sandwiched between the lead wire portions is an area where winding-corresponding areas each of which corresponds to a length of one turn of the coil 10 are formed continuously for the number of turns. Each of the plurality of winding-corresponding areas has a trapezoidal cross section, and the trapezoid has a different dimension for each winding-corresponding area.

Figure 3B:
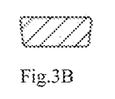
Figure 3C:
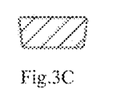
Figure 3D:
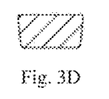
Figure 3E:
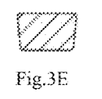
Figure 3F:
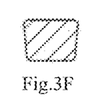

FIG. 3B illustrates a cross-sectional shape of a winding-corresponding area (trapezoid 1 portion) corresponding to turn numbers 1T and 2T. FIG. 3C illustrates a cross-sectional shape of a winding-corresponding area (trapezoid 2 portion) corresponding to turn numbers 3T and 10T. FIG. 3D illustrates a cross-sectional shape of a winding-corresponding area (trapezoid 3 portion) corresponding to turn numbers 4T and 9T. FIG. 3E illustrates a cross-sectional shape of a winding-corresponding area (trapezoid 4 portion) corresponding to turn numbers 5T and 8T. FIG. 3F illustrates a cross-sectional shape of a winding-corresponding area (trapezoid 5 portion) corresponding to turn numbers 6T and 7T. Note that the scales of FIGS. 3B to 3F are the same. In this manner, the conductive wire 11 is a wire having trapezoidal cross sections of five patterns in the present embodiment.

Note that a cross-sectional shape of the lead wire portion may be an arbitrary shape such as a circular shape and a rectangular shape. For example, the cross-sectional shape of the lead wire portion can be formed as a cross-sectional shape of a strand before being processed into the composite trapezoidal wire. As the strand, for example, a round wire having a diameter of about 1 mm can be used. In addition, the total length of the conductive wire 11 can be appropriately set in accordance with a shape of the slot of the stator, the number of turns of the coil 10, and the like. For example, when the coil 10 is a 10-turn coil arranged in a 12-slot stator, the total length of the conductive wire 11 can be set to about 780 mm. Furthermore, a connection portion which has a length of about 1 mm to 2 mm and in which each cross-sectional shape gradually changes may be provided in portions where the cross-sectional shape changes such as a portion between the lead wire portion and the trapezoid portion and a portion between the trapezoid portion and the trapezoid portion although not particularly illustrated.

In addition, the composite trapezoidal wire is not limited to the shapes illustrated in FIGS. 3A to 3F. For example, each winding-corresponding area may include a first area having a trapezoidal cross section and a second area having a rectangular cross section. Here, the first area is an area corresponding to the slot accommodating portion 12 of the coil 10, and the second area is an area corresponding to the coil end portions 13 and 14 of the coil 10. The rectangular shape in the second area can be the same shape in the respective winding-corresponding areas. In this case, coil cross sections of the coil end portions 13 and 14 have a rectangular shape. Merits of forming the cross-sectional shapes of the coil end portions 13 and 14 as the rectangular shapes are that the height of the coil end can be suppressed and that coil formation is facilitated since the conductive wire 11 is less likely to tilt during winding.

Next, a manufacturing method of the coil 10 according to the present embodiment will be described concretely. The coil 10 is manufactured by a winding device, which winds the conductive wires 11 in multiple layers and multiple rows and forms a coil 10A having a trapezoidal cross-sectional shape, and a molding device which molds the cross-sectional shape of the coil 10A formed by the winding device into a fan shape.

Figure 4:
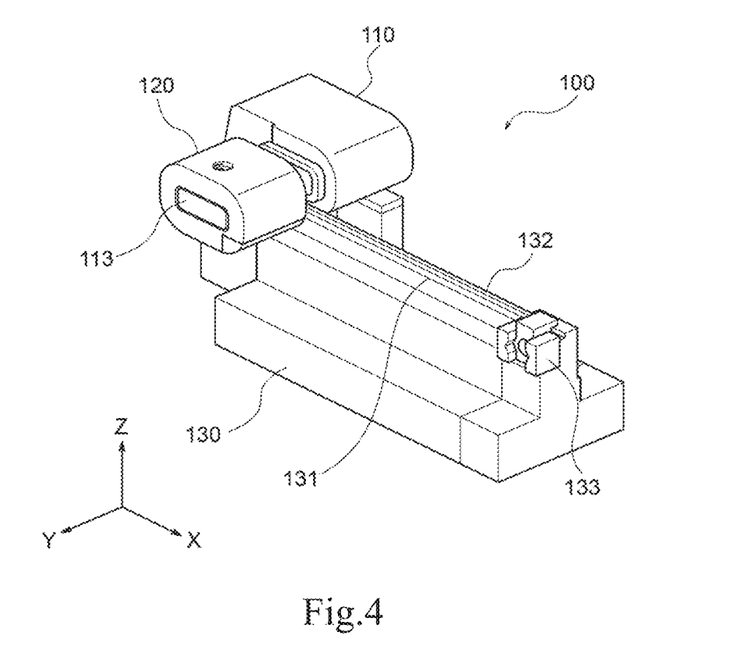
FIG. 4 is an overall configuration view illustrating an example of a coil winding device.
Figure 5:
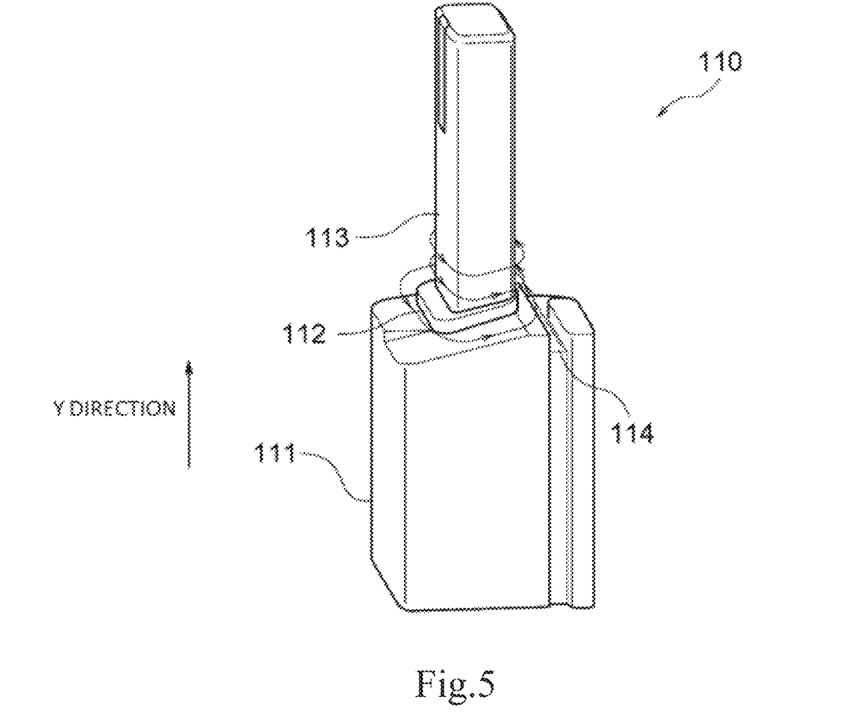
FIG. 5 is a configuration example of a first jig of a winding device.

FIG. 4 is a view illustrating a configuration of a winding device 100 configured to form the coil 10A before molding into the fan shape. The winding device 100 includes a first jig 110, a second jig 120, and a third jig 130. As illustrated in FIG. 5, the first jig 110 includes a body portion 111, a first winding core 112, and a second winding core 113. The vertical direction in FIG. 5 corresponds to the Y direction in FIG. 4.

The body portion 111 is provided with a concave portion 114 in which a winding start end of the conductive wire 11 is arranged. The first winding core 112 is a staircase-like stepped portion configured to wind a first row of the coils 10A in a spiral shape in order from the outermost circumference to the innermost circumference. The second winding core 113 is a member configured to wind each layer of second and subsequent rows of the coil 10A. An outer shape of the second winding core 113 viewed from the Y direction is formed to be equivalent to a shape viewed from the radial direction of the tooth 22 around which the coil 10 is wound. In the present embodiment, the coil 10A is a two-layer coil. Therefore, the first winding core 112 is constituted by the stepped portion having an outer shape larger by one step than that of the second winding core 113. The second winding core 113 is made of, for example, metal, and is configured to be attachable to and detachable from the body portion 111.

When the coil 10A is formed, first, the conductive wire 11 is wound around the first winding core 112 from the concave portion 114 of the body portion 111 and is successively wound around the second winding core 113 as indicated by the arrows in FIG. 5. As a result, the first row of the coil 10A is formed. Thereafter, the conductive wire 11 is directly wound around the second winding core 113 in a spiral shape. As a result, the innermost circumference of the second and subsequent rows of the coil 10A is formed. That is, the 1T-th to 6T-th turns of the coil 10A can be formed with the above steps. In addition, surfaces (upper surfaces in FIG. 5) of the body portion 111 and the first winding core 112 on the second winding core 113 side form surfaces which are spiral and inclined along the circumferential direction. Therefore, the conductive wire 11 can be easily and suitably wound in the spiral shape.

Figure 6:
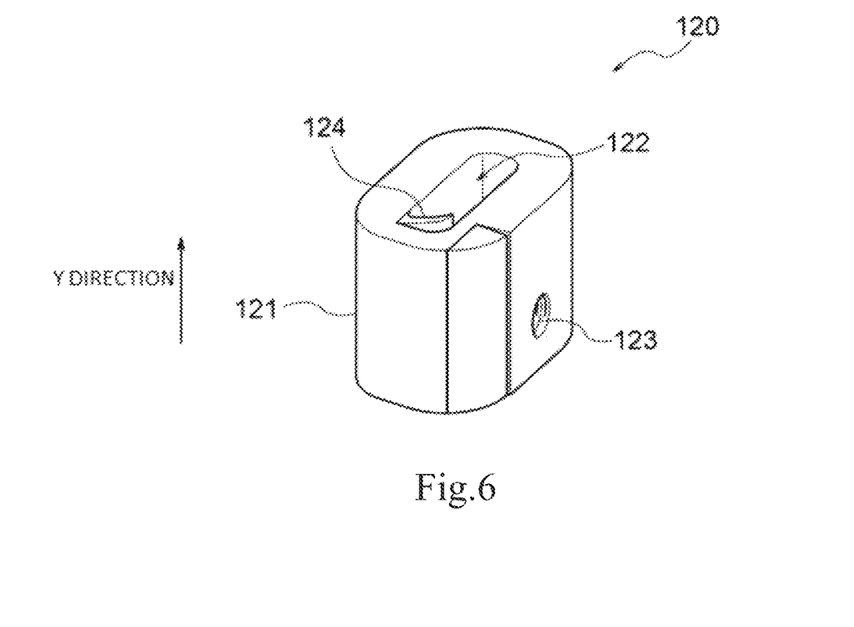
FIG. 6 is a configuration example of a second jig of the winding device.
Figure 7:
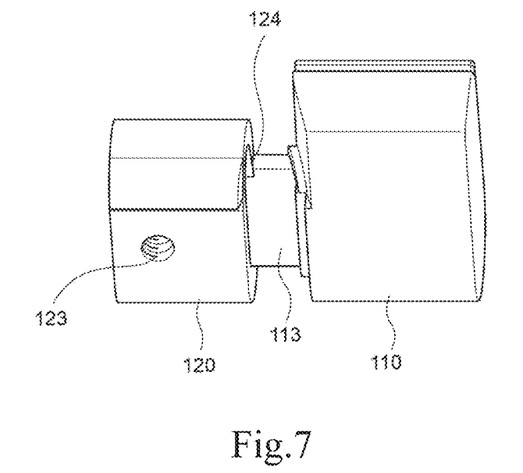
FIG. 7 is a view illustrating a first winding core of the second jig.

As illustrated in FIG. 6, the second jig 120 has a configuration in which a through-hole 122 that can be fitted to the second winding core 113 of the first jig 110 is formed in a body portion 121. Here, the vertical direction in FIG. 6 corresponds to the Y direction in FIG. 4. The body portion 121 is provided with a screw hole 123 in a direction orthogonal to the Y direction. The second jig 120 can be screwed to the second winding core 113 with a screw (not illustrated) inserted into the screw hole 123 in the state of being fitted to the second winding core 113. In addition, a convex portion 124 is provided in the vicinity of the through-hole 122 on one end surface (an upper surface in FIG. 6) of the body portion 121 in the Y direction. As illustrated in FIG. 7, the second jig 120 is fitted and screwed to the second winding core 113 with the end surface provided with the convex portion 124 opposing the body portion 111 of the first jig 110.

As illustrated in FIG. 4, the first jig 110 and the second jig 120 are arranged on one side in the Z direction (the upper side in FIG. 4) with respect to the third jig 130. The first jig 110 and the second jig 120 are configured to be capable of rotating about an axis in the Y direction and reciprocating in the Y direction (rotation axis direction). In addition, the first jig 110 and the second jig 120 may be configured to be capable of reciprocating in the X direction. The above rotation and movement of the first jig 110 and the second jig 120 are performed by a rotational movement mechanism (not illustrated).

The third jig 130 is a wire supply mechanism that supplies the conductive wire 11 to a predetermined winding position of the first jig 110 and the second jig 120. The third jig 130 includes: a receiving portion 131 configured to press and bend the conductive wire 11; a guiding portion 132 configured to guide the conductive wire 11 to the predetermined winding position of the first jig 110; and a holding portion 133 configured to apply tension to the conductive wire 11. The receiving portion 131 and the guiding portion 132 extend along the X direction. However, the configuration of the third jig 130 is not limited to the above configuration. For example, when the conductive wire 11 is relatively thick, it is desirable to provide the receiving portion 131 since the conductive wire 11 is easily bent by being pressed. In addition, when the conductive wire 11 is relatively thin, it is desirable to provide the holding portion 133 since the conductive wire 11 can be wound in the state of receiving the tension.

Figure 8:
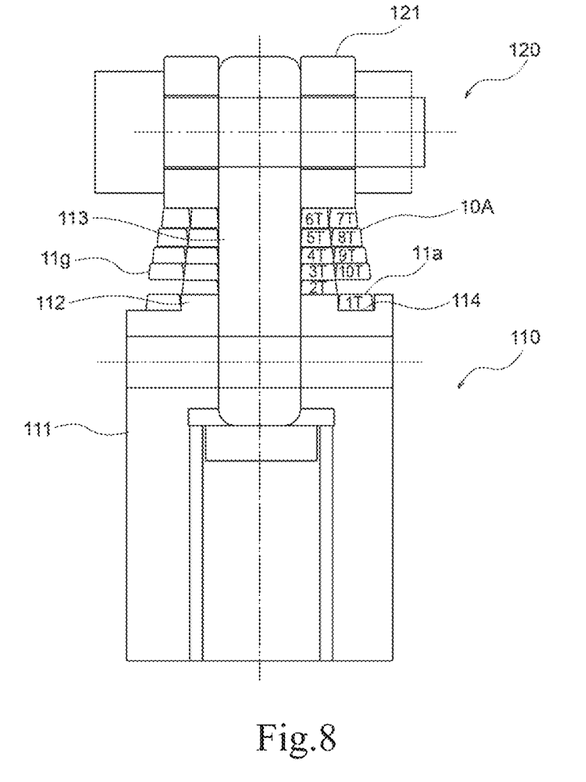
FIG. 8 is a view illustrating a winding sequence.
Figure 9:
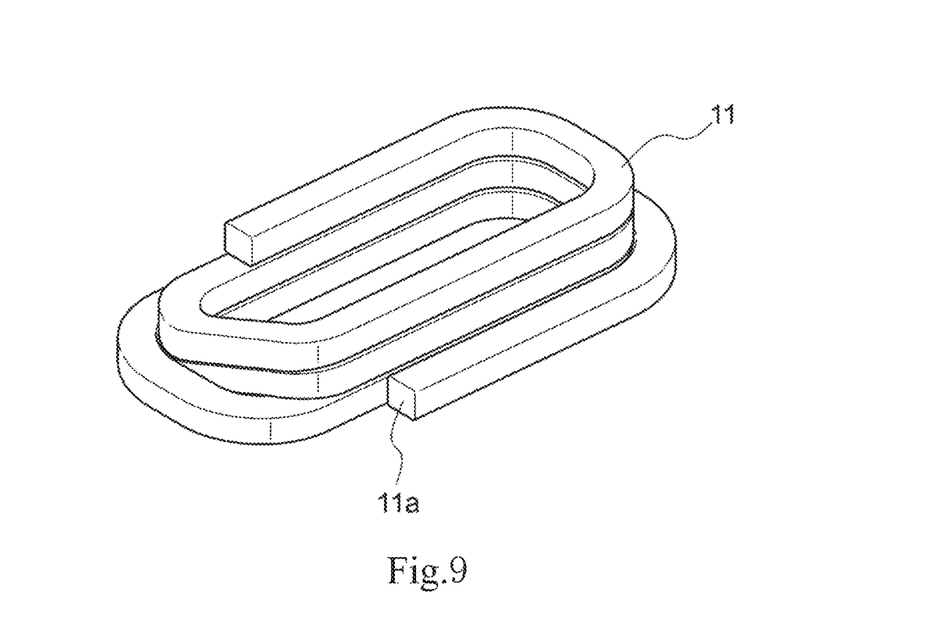
FIG. 9 is a view for describing a method of winding a first layer.
Figure 10:
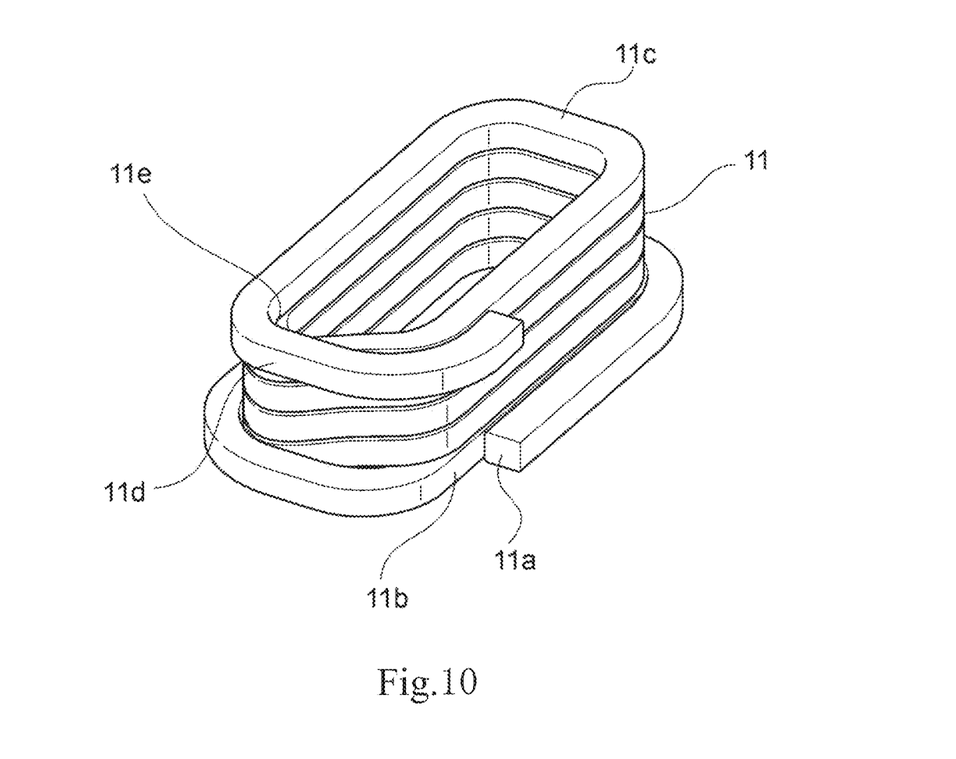
FIG. 10 is a view for describing a method of shifting from the first layer to a second layer.

FIG. 8 is a view illustrating a winding sequence. First, the winding device 100 arranges the conductive wire 11 in the concave portion 114 of the first jig 110, rotates the first jig 110 and the second jig 120 about the axis in the Y direction, and starts the 1T-th turn from a position lower by one stage than that of the 2T-th turn. At this time, the winding device 100 winds the conductive wire 11 around the first winding core 112 of the first jig 110. As a result, a conductive wire 11a serving as the winding start is led out to the coil outer circumference as illustrated in FIG. 9. Further, the winding device 100 moves in the Y direction while rotating the first jig 110 and the second jig 120 to wind the conductive wire 11 around the second winding core 113 of the first jig 110 in a spiral shape from the 2T-th to 6T-th turns. As a result, a 6T-th winding 11c is formed from a 2T-th winding 11b as illustrated in FIG. 10.

Next, the winding device 100 shifts from a winding of a first layer (first stage) to a winding of a second layer (second stage). At this time, the winding device 100 starts to wind the 7T-th winding, which is the start turn of the second stage so as to be overlaid immediately on the 6T-th winding 11c which is the final turn of the first stage. That is, a winding direction is reversed at an axial end of the coil 10A, and a coil end portion 11d that shifts from the 6T-th turn to the 7T-th turn crosses a coil end portion that shifts from the 5T-th turn to the 6T-th turn. With this overlap of the conductive wire 11, a gap 11e is formed between the layers. Therefore, the winding device 100 winds the conductive wire 11 by inserting the convex portion 124 provided in the second jig 120 into the gap 11e in the present embodiment. Accordingly, the winding of the first stage smoothly shifts to the winding of the second stage. Since the winding is performed by inserting the convex portion 124 into the gap 11e in this manner, it is possible to inhibit the conductive wire 11 from falling into the gap 11e and deviating and to wind the conductive wire 11 suitably.

Figure 11:
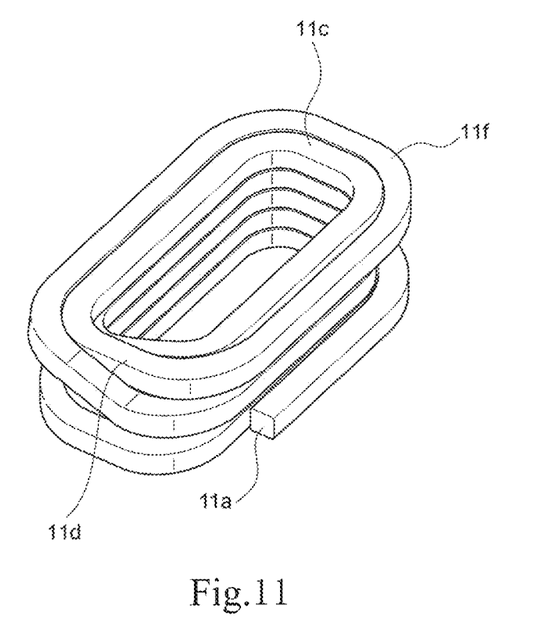
FIG. 11 is a view for describing a method of winding the second layer.

In the second stage, a 7T-th winding 11f is wound so as to be positioned immediately on the 6T-th winding 11c as illustrated in FIG. 11. Thereafter, the winding device 100 moves in the Y direction while rotating the first jig 110 and the second jig 120 from the 8T-th to the 10T-th turns to perform the winding immediately on the windings (from 5T-th to 3T-th turns) of the first stage. In this manner, the winding device 100 reciprocates in the Y direction while rotating the first jig 110 and the second jig 120, thereby winding the single conductive wire 11 in multiple layers and multiple rows in one direction. As a result, the coil 10A having the trapezoidal cross-sectional shape (coil before being molded into the fan shape) is formed as illustrated in FIG. 8. This coil 10A has a configuration in which the conductive wire 11a as the winding start is led out from the outermost circumference of the first row and a conductive wire 11g as a winding end is led out from the outermost circumference of the second row.

Figure 12:
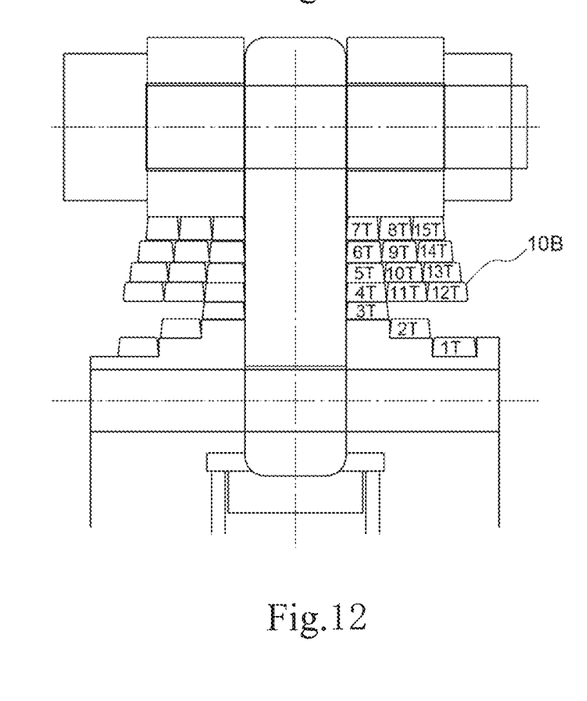
FIG. 12 is a view illustrating another example of the coil.
Figure 13:
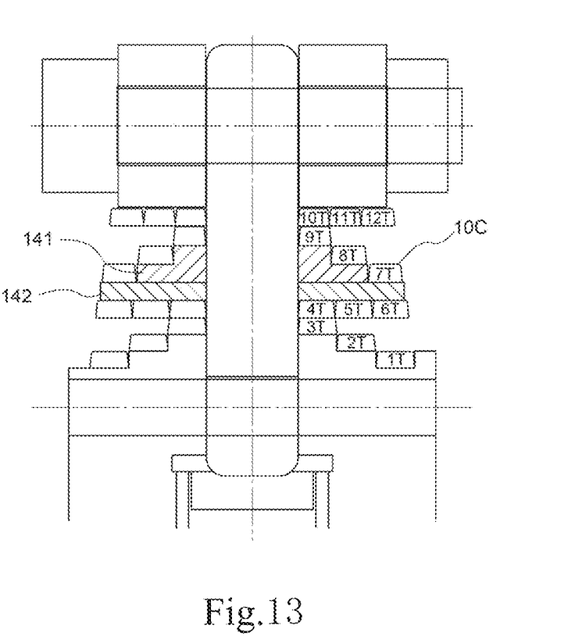
FIG. 13 is a view illustrating another example of the coil.

Note that the case where the coil 10A of ten turns (two layers and five rows) is formed has been described in the present embodiment, but the number of turns is not limited to the above number. For example, a coil 10B of fifteen turns (three layers and five rows) may be formed as illustrated in FIG. 12. In addition, a coil 10C of twelve turns (three layers and four rows) can be formed as illustrated in FIG. 13. Furthermore, when a three-layer coil is formed, winding spacers 141 and 142 may be inserted in the central portion as illustrated in FIG. 13. In this case, the winding spacer 141 is provided with a staircase-like stepped portion similarly to the first winding core 112 of the first jig 110. In addition, the winding spacer 142 is provided with a stepped portion (convex portion) configured for the smooth shift of the conductive wire 11 from the first stage to the second stage similarly to the convex portion 124 of the second jig 120.

Figure 14:
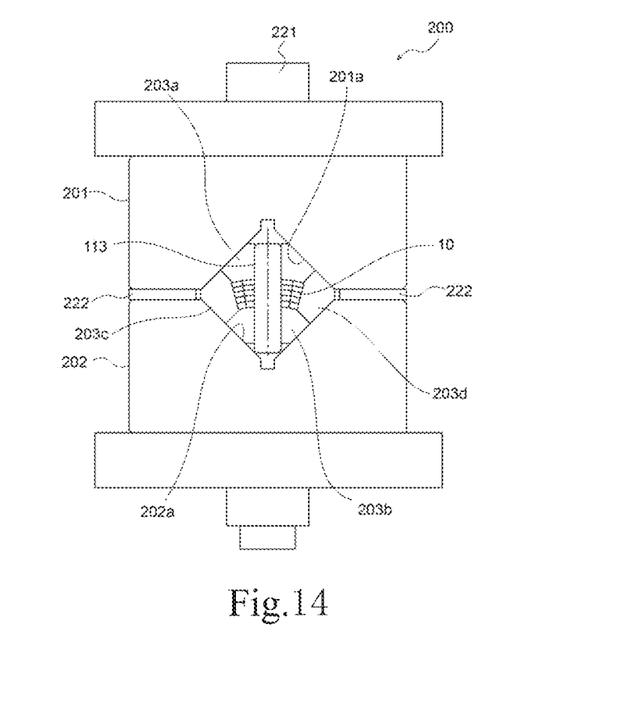
FIG. 14 is an overall configuration view illustrating an example of a coil molding device.

Next, the molding device that molds the cross-sectional shape of the coil 10A formed by the winding device 100 into the fan shape will be described. FIG. 14 is a view illustrating a configuration of a molding device 200 for molding the coil 10A. FIG. 14 illustrates a state where the coil 10A having the trapezoidal cross section has been formed into the coil 10 having the fan-shaped cross section. The molding device 200 includes a pair of V blocks 201 and 202 that are relatively movable forward and backward, and a plurality (four in the present embodiment) of split dies 203a to 203d. The pair of V blocks 201 and 202 are arranged with V grooves 201a and 202a opposing each other. In addition, the four split dies 203a to 203d are arranged so as to form a molding space in which the coil 10A before molding is arranged in the state of being wound around the winding core 113.

Among the four split dies 203a to 203d, the first split die 203a is fixed to one V groove 201a of the V block 201, and the second split die 203b is fixed to the other V groove 202a of the V block 202. In addition, the third split die 203c is in sliding-contact with one surface of each of the V grooves 201a and 202a, and the fourth split die 203d is in sliding-contact with the other surface of each of the V grooves 201a and 202a.

The V blocks 201 and 202 receive a pressing load in directions of approaching each other by a bolting jig 221 and are fixed with a spacer 222 therebetween. The spacer 222 is a regulating member configured to regulate the movement of the V blocks 201 and 202 in the approaching directions so as to prevent mutual contact among the four split dies. The spacer 222 is a flat plate member arranged between the V blocks 201 and 202, and is fixed to any one of the V blocks 201 and 202. As the V blocks 201 and 202 move in the directions of approaching each other and the other of the V blocks 201 and 202 abuts on the spacer 222, the movement of the both in the approaching directions is regulated.

Each of the first split die 203a and the second split die 203b has a molding surface that molds a surface (arc surface) corresponding to the arc constituting the fan shape that is the cross-sectional shape of the coil 10. In addition, each of the third split die 203c and the fourth split die 203d has a molding surface that molds a surface (flat surface) corresponding to the straight line constituting the fan shape that is the cross-sectional shape of the coil 10.

For example, when the V block 202 is fixed and the pressing load is applied from above the V block 201 by the bolting jig 221, the first split die 203a fixed to the V block 201 moves downward in FIG. 14 to press an upper surface of the coil 10A. In addition, the second split die 203b fixed to the V block 202 presses a lower surface of the coil 10A. At this time, the third split die 203c slides in the V grooves 201a and 202a and moves in a direction of pressing a left side surface of the coil 10A. In addition, the fourth split die 203d also similarly moves in a direction of pressing a right side surface of the coil 10A. In this manner, the four split dies 203a to 203d can be caused to abut on the coil 10A from the four directions by the pressing load from one direction. Therefore, the coil 10A having the trapezoidal cross-section can be molded into the coil 10 having the fan-shaped cross-section in one step.

In addition, the molding surfaces of the first split die 203a and the second split die 203b are configured as regions where the conductive wires 11 in the coil 10A is wound in completely aligned windings, that is, configured to be in contact with the slot accommodating portion 12 and the coil end portion 14. As described above, the conductive wire 11 is not aligned in the coil end portion 13, close to the lead wire, of the coil 10A. Therefore, when pressure is applied to the coil end portion 13 from the top, bottom, left and right, there is a concern that the pressure is not evenly applied to each of the conductive wires 11, and some of the conductive wires 11 are sunk into the other conductive wires 11 to cause an insulation failure.

Figure 15:
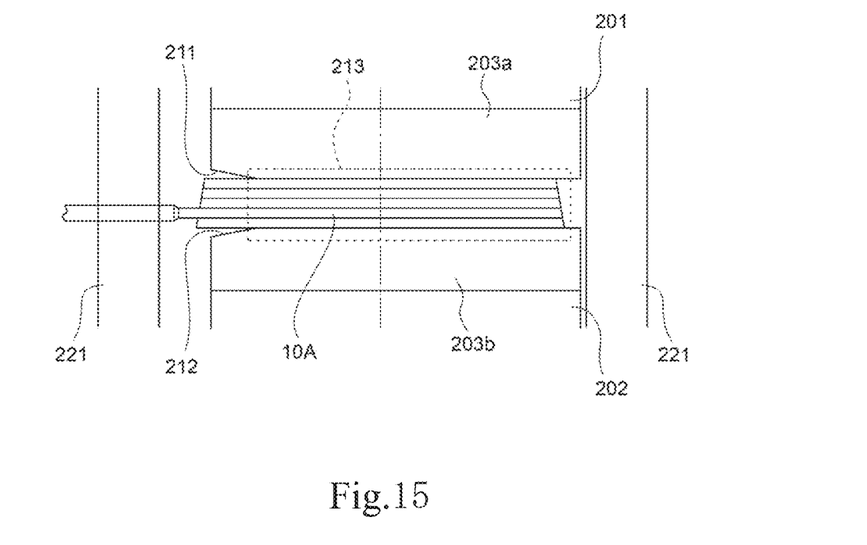
FIG. 15 is a view illustrating a relief portion of a split die.

Therefore, relief portions 211 and 212 are provided on the surfaces, which oppose the coil 10A, of the first split die 203a and the second split die 203b in the present embodiment as illustrated in FIG. 15 Further, uniform pressure is applied only to a region 213 of the coil that has been wound to be completely aligned as indicated by the dotted line from the top, bottom, left, and right so as to mold the region 213 into a fan shape. In this manner, the molding processing using the split dies is performed while a region that does not form a completely aligned winding is avoided. As a result, it is possible to avoid the generation of the insulation failure caused by the sinking of the conductive wire 11 as described above.

Figure 16:
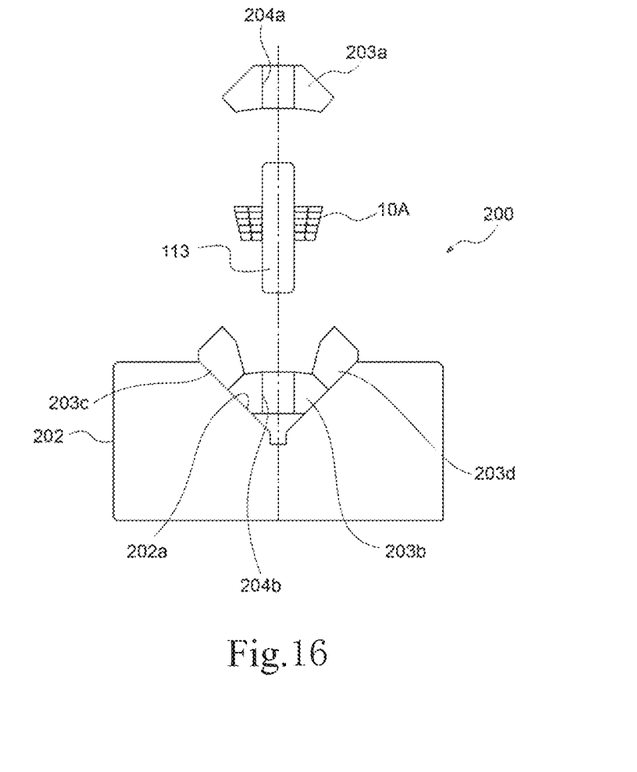
FIG. 16 is a view illustrating the coil before molding.

Next, a process of a fan shape molding step will be described. There is a risk that the coil 10A may be separated if the coil 10A is removed from the winding core 113 after the coil 10A is formed by the winding device 100. Therefore, the coil 10A is removed from the winding device 100 in the state of being wound around the winding core 113 after winding and is set in the molding device 200 as illustrated in FIG. 16. Note that only the main members of the molding device 200 are illustrated in FIG. 16. The first split die 203a and the second split die 203b are formed with through-holes 204a and 204b into which ends of the winding core 113 can be fitted, respectively. The coil 10A in the state of being wound around the winding core 113 is arranged in the molding space formed in the molding device 200 as the both ends of the winding core 113 are fitted into the through-holes 204a and 204b, respectively.

When the coil 10A is arranged in the molding space, the load is applied in the direction in which the pair of V blocks 201 and 202 approach each other using the bolting jig 221 as described above, and the four split dies 203a to 203d are moved in directions of narrowing the molding space. As illustrated in FIG. 15, the bolting jig 221 includes bolts arranged outside the V blocks 201 and 202 and the split dies 203a to 203d, and can apply the above-described load to the V blocks 201 and 202 by tightening the bolts. As a result, the coil 10 whose cross-sectional shape has been molded into the fan shape is formed as illustrated in FIG. 14. Note that the number of bolts and arrangement positions thereof can be set as appropriate.

Figure 17:
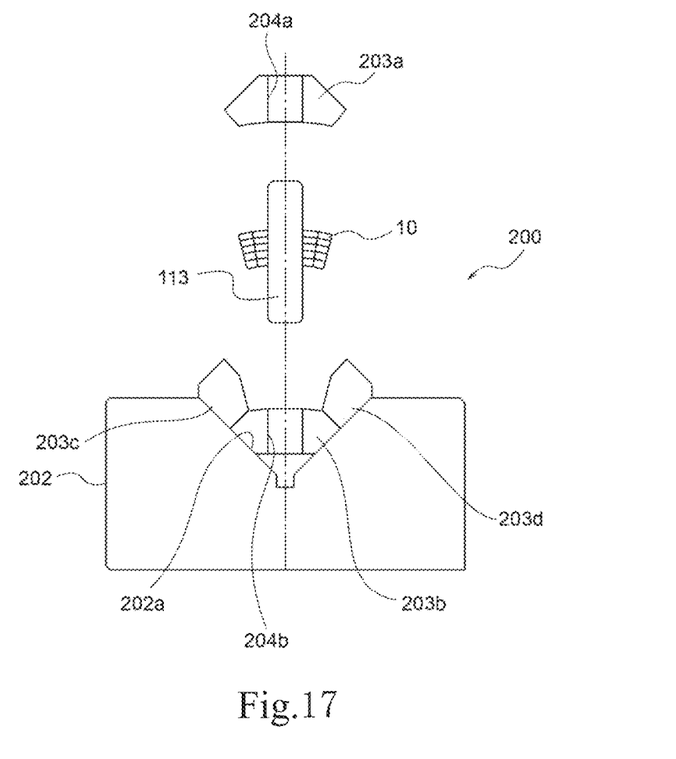
FIG. 17 is a view illustrating the coil after molding.

Thereafter, a fixing step of hardening the coil 10 is performed in order to prevent the coil 10 molded in the fan shape from being separated. As a method of hardening the coil 10, it is possible to employ a method of using an enameled wire called a self-bonding wire and applying heat to cause coil wires to be bonded to each other. In the step of hardening the coil 10, heat is applied to the coil 10 while the V blocks 201 and 202 are fixed by the bolting jig 221 as illustrated in FIG. 14. In this manner, the heat is applied to harden the coil 10 after molding in the present embodiment. Therefore, the load is applied using the bolting jig 221 instead of a press machine. After the coil 10 is hardened, the pressing load using the bolting jig 221 is released, and the coil 10 is taken out together with the winding core 113 as illustrated in FIG. 17.

Figure 18:
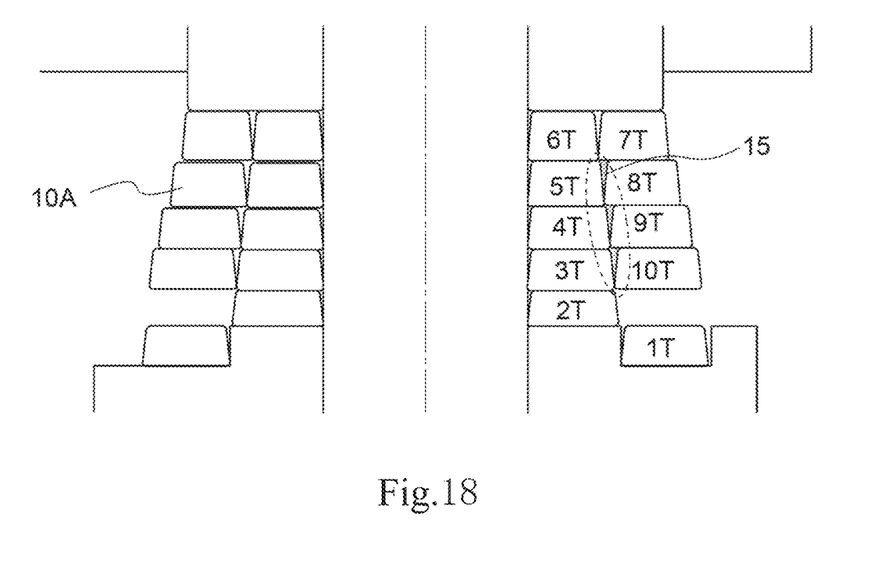
FIG. 18 is a view illustrating a method of hardening the coil.

Note that the method of hardening the coil 10 is not limited to the above method. In the above-described method using the self-bonding wire, the space factor decreases by a thickness of a bonding layer of the self-bonding wire, and thus, the coil 10 may be hardened with an adhesive. In this case, a small amount of a silicone adhesive 15 is applied to a coil inner region indicated by the dotted line in FIG. 18 in a winding step, and the silicone adhesive 15 is cured after molding into the fan shape in the fan shape molding step. In the winding step, the silicone adhesive may be applied to an outer circumferential surface of the winding of the first stage after forming the 7T-th winding. As a result, the space factor can be further increased.

As described above, the coil 10 whose cross section has the fan shape using the composite trapezoidal wire is manufactured through the winding step, the fan shape molding step, and the fixing step in the present embodiment. In the winding step, the conductive wire 11 is wound in multiple layers and multiple rows, and the coil 10A having the trapezoidal cross-sectional shape is formed. In the fan shape molding step, the coil 10A is arranged in the molding space surrounded by the plurality of split dies, and the pressing load is applied from one direction to move at least one of the plurality of split dies in the direction of narrowing the molding space, thereby molding the cross-sectional shape of the coil 10A into the fan shape. In this manner, the high space factor coil having the fan-shaped cross-sectional shape can be manufactured by the molding process using the plurality of split dies in the present embodiment.

In addition, in the winding step, the single conductive wire 11 is wound in multiple layers and multiple rows in one direction, and the lead wire is arranged at the outermost circumference. At this time, the crossing (overlap) of the conductive wire 11 is performed at the coil end portion 13 on the lead wire side, and at least the slot accommodating portion 12 is formed as the completely aligned windings. The winding device 100 used in this winding step includes: the rotational movement mechanism that causes the first jig 110 and the second jig 120 constituting the winding core to reciprocate in the rotation axis direction while rotating the first jig 110 and the second jig 120; and the wire supply mechanism that supplies the conductive wire 11 to the predetermined winding position of the winding core. In addition, the first jig 110 includes: the concave portion 114 in which the winding start end of the conductive wire 11 is arranged; the staircase-shaped first winding core 112 configured to wind the first row of the coil 10A in order from the outermost circumference to the innermost circumference; and the second winding core 113 configured to wind each layer of the second and subsequent rows of the coil 10A.

That is, the winding device 100 first forms the first row of the coils 10A. Next, the winding device 100 forms a layer of the innermost circumference (first layer) of the second and subsequent rows. At this time, the winding device 100 moves the first jig 110 and the second jig 120 in the rotation axis direction while rotating the first jig 110 and the second jig 120 to wind the first layer of the second and subsequent rows around the second winding core 113 in a spiral shape. Further, when a winding position reaches a position corresponding to the axial end of the coil 10A, the winding device 100 reverses the movement of the first jig 110 and the second jig 120 in the rotation axis direction to wind the second layer of the second and subsequent rows around the second winding core 113 in a spiral shape. Thereafter, the above operation is repeated until a layer of the outermost circumference of the second and subsequent rows is formed.

With such a configuration, the winding device 100 can form the serially wound coil 10A in which the winding start portion and the winding end portion are led out to the outer circumferential portion of the coil in one step. In addition, the winding device 100 includes the convex portion 124 that can be inserted into the gap 11e which can be generated between layers of the coil 10A at the position corresponding to the axial end of the coil 10A. Further, the winding device 100 winds the conductive wire 11 by inserting the convex portion 124 into the gap 11e at the axial end of the coil 10A. Therefore, it is possible to cause the smooth shift from the winding of the first layer to the winding of the second layer and to suitably reverse the winding direction.

Furthermore, the surfaces corresponding to the two arcs and the two straight lines constituting the fan shape, which is the cross-sectional shape of the coil 10, are respectively molded by the molding surfaces respectively provided in the four split dies 203a to 203d in the fan shape molding step. Therefore, molded surfaces of the coil 10 become highly accurate surfaces having no step. In addition, the uniform pressure can be applied to the coil 10A with the winding core 113 and the four split dies 203a to 203d in this fan shape molding step. For example, when it is attempted to mold a coil only with a winding core and upper and lower split dies, it is difficult to suitably perform molding of the coil in multiple layers and multiple rows, and it is only possible to deal with molding of a coil in multiple layers with a single row or a single layer with multiple rows. In the present embodiment, the molding of the coil in multiple layers and multiple rows can be suitably performed using the winding core 113 and the four split dies 203a to 203d.

The molding device 200 used in the fan shape molding step includes: the pair of V blocks 201 and 202; the four split dies 203a to 203d; and the bolting jig 221 serving as the movement mechanism that moves the four split dies 203a to 203d in the directions of narrowing the molding space. Here, the first split die 203a is fixed to the V groove 201a of the V block 201, and the second split die 203b is fixed to the V groove 202a of the V block 202. In addition, the third split die 203c is in sliding-contact with one surface of each of the V grooves 201a and 202a, and the fourth split die 203d is in sliding-contact with the other surface of each of the V grooves 201a and 202a.

With such a configuration, when the V blocks 201 and 202 are moved in the directions of approaching each other, the four split dies 203a to 203d can be moved in the directions of narrowing the molding space in conjunction with the movement of the V blocks 201 and 202. In other words, the four split dies 203a to 203d can be caused to abut on the coil 10A respectively from the four directions by the pressing load from one direction. Therefore, the coil 10 having the fan-shaped cross-sectional shape can be suitably formed in one step. In addition, the four split dies 203a to 203d can be arranged using the V grooves 201a and 202a of the V blocks 201 and 202 as reference planes, and thus, the coil 10 can be molded with high accuracy.

Furthermore, the first split die 203a and the second split die 203b have the relief portions 211 and 212 that do not come into contact with the coil 10A, respectively, on the surfaces opposing the coil 10A. Further, the molding surfaces of the first split die 203a and the second split die 203b come into contact with the region where the conductive wire 11 in the coil 10A is wound in the completely aligned windings. That is, the molding device 200 molds the portion that has been wound to be completely aligned in the coil 10A from the trapezoidal cross-sectional shape to the fan-shaped cross-sectional shape. In the present embodiment, the coil end portion 13 on the lead wire side is the region that does not form the completely aligned windings, and thus, the molding device 200 performs the molding processing using the split dies while avoiding the coil end portion 13. As a result, it is possible to avoid a problem of the sinking of the coil wire in the coil end portion 13 and to avoid trouble such as the generation of the insulation failure.

In addition, the molding device 200 includes the spacer 222 as a regulating member that regulates the movement of the pair of V blocks 201 and 202 in the approaching directions, and can regulate the pair of V blocks 201 and 202 so as not to approach each other within a predetermined distance. As a result, it is possible to prevent contact between the split dies moved in the directions of narrowing the molding space. The closest distance between the split dies moved in the directions of narrowing the molding space is, for example, 50 μm. As a result, it is possible to alleviate the tolerance on the opposing surfaces of the split dies. In addition, it is possible to suppress the formation of an undesired gap between the other split dies due to unintended contact between the split dies, and thus, the coil having a desired shape can be molded with high accuracy.

In addition, when shifting from the winding step to the fan shape molding step in the present embodiment, the coil 10A is removed from the winding device 100 together with the winding core 113 and set in the molding device 200 after the winding step, and the fan shape molding step is performed. In this manner, the winding core 113 is used as an independent part in both the winding step and the fan shape molding step. As a result, the shift to the fan shape molding step becomes possible without removing the coil 10A from the winding core, and thus, it is possible to prevent the coil 10A from being separated. Furthermore, since the winding core 113 is configured as the part made of metal, it is possible to avoid a problem that the conductive wire 11 bites into the winding core is not removable when winding the conductive wire 11, for example, when the winding core is produced by 3D resin modeling.

In the above embodiment, the description has been given regarding the case of using a so-called axis-rotation type in which the winding device 100 winds the conductive wire 11 by rotating the first jig 110 and the second jig 120 about the axis in the Y direction. However, the winding method of the conductive wire 11 is not limited to the above type, and a so-called flyer type, for example, in which the conductive wire 11 is wound by rotating the third jig 130 side that is the holding side of the conductive wire 11 may be used.

In addition, the first split die 203a may be integrally formed with one V block 201 in the molding device 200. Similarly, the second split die 203b may be integrally formed with the other V block 202. In this case, it is possible to prevent the generation of deviation between the both due to the influence of a temperature change or the like, for example. Therefore, the coil 10 having a desired shape can be molded with high accuracy.

Furthermore, the molding device 200 may further include a biasing member that biases the third split die 203c and the fourth split die 203d in directions of expanding the molding space. For example, the third split die 203c and the fourth split die 203d may be fixed to a slider to be slidable in directions corresponding to the left and right directions in FIG. 14, respectively, and one end of the biasing member may be fixed to the slider. In this case, the other end of the biasing member can be fixed to any one of the V blocks 201 and 202 or another member connected to any one of the V blocks 201 and 202. With such a configuration, when the pair of V blocks 201 and 202 move in directions of separating apart from each other, the third split die 203c and the fourth split die 203d can be moved in directions of separating apart from each other by the biasing member in conjunction with the movement of the V blocks 201 and 202. Therefore, it becomes easy to take out the coil 10 after molding.

In addition, the molding device 200 may be configured to move movement target dies in directions of narrowing the molding space at different speeds regarding at least two or more movement target dies to be moved among the plurality of split dies 203a to 203d. That is, the molding device 200 may be configured such that the timings at which the molding surfaces of the split dies are made abut on the coil 10A are different. For example, the third split die 203c and the fourth split die 203d are fixed to a slider to be slidable in directions corresponding to the left and right directions in FIG. 14, respectively. Further, a cam surface provided on the slider is engaged with a cam surface provided on the V block 201 or another member connected to the V block 201 when the V block 201 is moved in a direction corresponding to the downward direction of FIG. 14 so as to move the slider such that the third split die 203c and the fourth split die 203d approach each other. At this time, a moving speed of the V block 201 (a moving speed of the first split die 203a) and a moving speed of the third split die 203c and the fourth split die 203d can be set to different speeds by appropriately setting an inclination angle of the cam surface. In this manner, the coil 10 having a desired shape can be molded with high accuracy by adjusting the timing at which the molding surface of the split die is made abut on the coil 10A.

In addition, the description has been given in the above embodiment regarding the case where the molding device 200 includes the pair of V blocks and four split dies, but the configuration of the molding device 200 is not limited to the above configuration. It is sufficient for the molding device 200 to include: a plurality of split dies which are arranged so as to form a molding space in which the coil 10A formed by the winding device 100 is arranged in the state of being wound around the winding core 113; and a movement mechanism that moves at least one of the plurality of split dies in a direction of narrowing the molding space. For example, the molding device 200 may be configured to have a pair of split dies which are relatively movable forward and backward such that at least one of the pair of split dies is disassembled into a plurality of parts. That is, it is sufficient for the molding device 200 to be capable of molding the cross-sectional shape of the coil 10 into a desired shape and easily removing the molded coil 10 from the split die.

The invention claimed is:

1. A coil manufacturing method, comprising:
   a step of forming a coil having a trapezoidal cross-sectional shape by winding a wire in multiple layers and multiple rows;
   a step of arranging the coil in a molding space surrounded by a plurality of split dies; and
   a step of molding the cross-sectional shape by moving at least one of the plurality of split dies in a direction of narrowing the molding space,
   wherein the at least one of the plurality of split dies is moved to mold the cross-sectional shape into a fan shape by a surface formed in the at least one of the plurality of split dies in the step of molding the cross-sectional shape, and
   wherein regarding at least two or more movement target dies to be moved among the plurality of split dies, the at least two or more movement target dies are moved in directions of narrowing the molding space at different speeds, respectively, in the step of molding the cross-sectional shape.

2. The coil manufacturing method according to claim 1, wherein
   the wire is a single wire wound in multiple layers and multiple rows in the step of forming the coil.

3. The coil manufacturing method according to claim 2, wherein
   the single wire is wound in multiple layers and multiple rows in one direction, and a lead wire is arranged at an outermost circumference in the step of forming the coil.

4. The coil manufacturing method according to claim 1, wherein
   a cross-sectional shape of a region of the coil in which the wire is wound in completely aligned windings is molded into the fan shape in the step of molding the cross-sectional shape.

5. The coil manufacturing method according to claim 1, wherein
   four split dies are used as the plurality of split dies to mold each of surfaces corresponding to two arcs and two straight lines constituting the fan shape by molding surfaces of the four split dies in the step of molding the cross-sectional shape.

6. The coil manufacturing method according to claim 1, wherein,
   a pressing load is applied from one direction to move the at least one of the plurality of split dies in the direction of narrowing the molding space in the step of molding the cross-sectional shape.

7. A coil manufactured by the coil manufacturing method according to claim 1 and attached to a stator, wherein
   a cross-sectional shape of the coil inside a slot of the stator is a fan shape.

8. The coil according to claim 7, wherein
   the cross-sectional shape of the coil inside the slot is the fan shape constituted by two concentric arcs having different centers from a core back of the stator and straight lines respectively connecting ends of the two arcs, and
   one of the straight lines connecting ends, close to a tooth, of the two arcs is a straight line along a shape of the tooth.

9. A motor comprising:
   a shaft centered on a central axis extending in a predetermined direction;
   a rotor fixed to the shaft; and
   a stator,
   wherein the stator comprises:
      an annular core back;
      a tooth protruding radially from the core back; and
      a coil wound around the tooth, and
   the coil is the coil according to claim 7.

10. A coil manufacturing device comprising:
    a winding device that comprises a winding core configured to form a coil which is obtained by winding a wire in multiple layers and multiple rows and has a trapezoidal cross-sectional shape;
    a molding device that molds the cross-sectional shape of the coil formed by the winding device; and
    a pair of V blocks which are relatively movable forward and backward and have V grooves arranged to oppose each other, wherein
    the molding device comprises:
       a plurality of split dies arranged so as to form a molding space in which the coil formed by the winding device is arranged in a state of being wound around the winding core; and
       a movement mechanism that moves at least one of the plurality of split dies in a direction of narrowing the molding space,
    the cross-sectional shape of the coil is molded into a fan shape by a surface formed in the at least one of the plurality of split dies, and
    the plurality of split dies includes:
       a first split die fixed to one V groove of the pair of V blocks;
       a second split die fixed to the other V groove of the pair of V blocks;
       a third split die in sliding-contact with one surface of each of the V grooves of the pair of V blocks; and
       a fourth split die in sliding-contact with the other surface of each of the V grooves of the pair of V blocks.

11. The coil manufacturing device according to claim 10, wherein
    one of the pair of V blocks and the first split die are integrally formed, and
    the other of the pair of V blocks and the second split die are integrally formed.

12. The coil manufacturing device according to claim 10, wherein each of the first split die and the second split die has a molding surface to mold an arc surface corresponding to an arc constituting the fan shape, and the molding surface is in contact with a region of the coil in which the wire is wound in completely aligned windings.

13. The coil manufacturing device according to claim 10, wherein the molding device further comprises a biasing member that biases the third split die and the fourth split die respectively in directions of expanding the molding space.

14. The coil manufacturing device according to claim 10, wherein the molding device further comprises a regulating member that regulates movement of the pair of V blocks in approaching directions.

15. The coil manufacturing device according to claim 10, wherein at least one of the plurality of split dies is configured to be disassembled into a plurality of parts.

16. A coil manufacturing device, comprising:

a winding device that comprises a winding core configured to form a coil which is obtained by winding a wire in multiple layers and multiple rows and has a trapezoidal cross-sectional shape; and a molding device that molds the cross-sectional shape of the coil formed by the winding device, wherein the molding device comprises:

a plurality of split dies arranged so as to form a molding space in which the coil formed by the winding device is arranged in a state of being wound around the winding core; and a movement mechanism that moves at least one of the plurality of split dies in a direction of narrowing the molding space, the cross-sectional shape of the coil is molded into a fan shape by a surface formed in the at least one of the plurality of split dies, the winding device further comprises:

a rotational movement mechanism that causes the winding core to reciprocate in a rotation axis direction while rotating the winding core; and a wire supply mechanism that supplies the wire to a predetermined winding position of the winding core.

17. The coil manufacturing device according to claim 16, wherein the winding core further comprises:

a concave portion where a winding start end of the wire is arranged;

a staircase-shaped first winding core configured to wind a first row of the coil in order from an outermost circumference to an innermost circumference; and a second winding core configured to wind each layer of a second and subsequent rows.

18. The coil manufacturing device according to claim 16, wherein the winding core further comprises a convex portion that is insertable into a gap generatable between layers of the coil at a position corresponding to an axial end of the coil.

* * * * *